United States Patent [19]

Wu

[11] Patent Number: 5,570,734
[45] Date of Patent: Nov. 5, 1996

[54] SUNSHIELDING CURTAIN FOR AN AUTOMOBILE

[76] Inventor: Hans Wu, 2F, No. 2, Alley 97, Lane 226, Sec. 3, Tung-Men Rd., Tainan City, Taiwan

[21] Appl. No.: 372,941

[22] Filed: Jan. 17, 1995

[51] Int. Cl.⁶ .................................................. A47H 1/00
[52] U.S. Cl. ............................ 160/370.21; 160/368.1; 296/97.7; 296/97.9
[58] Field of Search ..................... 160/368.1, 354, 160/370.21, 370.22, 370.23, 84.02, 84.04, 371; 296/97.7, 97.8, 97.9, 138, 152

[56] References Cited

U.S. PATENT DOCUMENTS

| | | | |
|---|---|---|---|
| 3,751,100 | 8/1973 | Keyes | 160/370.21 X |
| 5,183,094 | 2/1993 | Montasham et al. | 160/370.21 |
| 5,379,822 | 1/1995 | Lenetz | 160/370.21 |

*Primary Examiner*—Blair Johnson
*Attorney, Agent, or Firm*—Harness, Dickey & Pierce, P.L.C.

[57] ABSTRACT

A sunshielding curtain includes a pressure adhesive sheet unit adapted to be adhered to a glass window and a sunshielding sheet heat-sealed to the adhesive sheet unit. The adhesive sheet unit includes one horizontal row of adhesive subunits each of which has a central portion that is heat-sealed to the shielding sheet. Each of the adhesive subunits is further heat-sealed to the sunshielding sheet along a horizontal seal line which is located at the intermediate portion of the top side of the sunshielding sheet. Two top corners of the top side of the sunshielding sheet are not heat-sealed to the adhesive sheet unit.

3 Claims, 8 Drawing Sheets

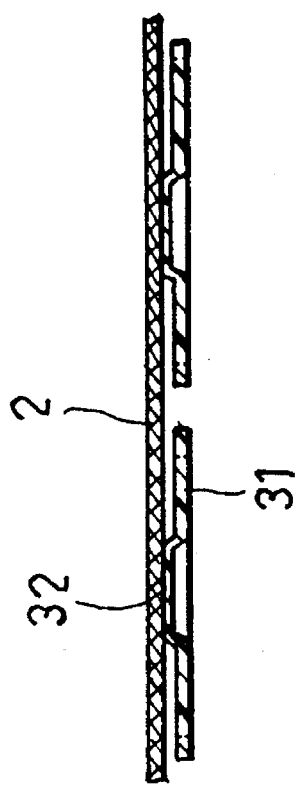
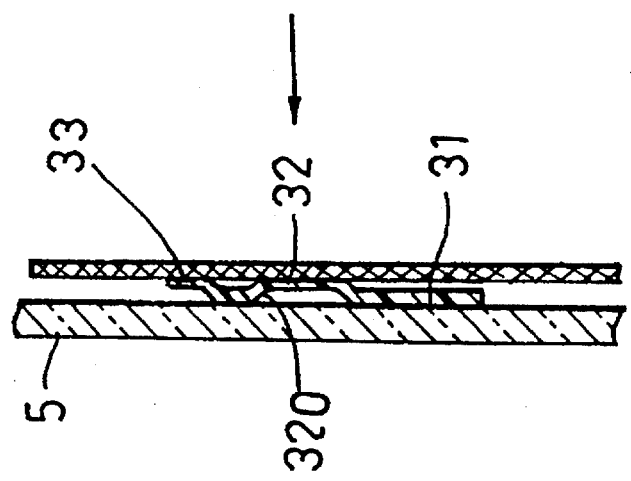

5,570,734

SUNSHIELDING CURTAIN FOR AN AUTOMOBILE

BACKGROUND OF THE INVENTION

1. Field of the Invention

The invention relates to a sunshielding curtain, more particularly to a sunshielding curtain for an automobile which can be retained effectively on a glass window of the automobile.

2. Description of the Related Art

Sunshielding curtains are usually installed on the glass window of an automobile in order to prevent the build-up of high temperatures in the automobile when the latter is parked for a relatively long period under the scorching sun.

FIGS. 1 and 2 show a conventional sunshielding curtain which includes a nylon net sunshielding sheet 11 and two pressure sensitive adhesive strips 12 attached respectively on two end portions of the sunshielding sheet 11. Note that each of the pressure sensitive adhesive strips 12 is made of a plastic clinging material. The pressure sensitive adhesive strips 12 and the sunshielding sheet 11 are heat-sealed along the horizontal peripheral edges thereof, thereby forming two seal lines 13 which connect integrally the sunshielding sheet 11 and the pressure sensitive adhesive strips 12 therealong. Because the sunshielding sheet 11 is a netted sheet with a void between any adjacent pair of parallel threads such that the plastic clinging material is filled into the void upon application of heat, thereby bending possibly two distal ends 131 of the seal line 13 of the curtain away from the glass window 5. Thus, the conventional curtain may fall from the glass window 5.

FIGS. 3 and 4 show another conventional sunshielding curtain which does not have the above-mentioned drawbacks and includes a sunshielding sheet 11A and a pressure sensitive adhesive sheet 12A attached to the sunshielding sheet 11A. The pressure sensitive adhesive sheet 12A is formed with an interior face that lies against the sunshielding sheet 11A and an exterior face opposite to the interior face. The pressure sensitive adhesive sheet 12A has a plurality of separate concave portions on the exterior face. The interior face of the pressure adhesive sheet 12A is fixed on the sunshielding sheet 11A at positions 14 corresponding to the separate concave portions.

When the pressure sensitive adhesive sheet 12A is pressed against the glass window of an automobile, each of the separate concave portions serves as a suction cup which adheres to the glass window. However, when the sunshielding curtain of this type is exposed to the sun for a relatively long period, folds may occur on the pressure sensitive sheet 12A due to the temperature build-up, thereby moving at least one of the connecting positions 14 to the position 141 shown by the phantom lines of FIG. 4, and causing uneven outer surface of the sunshielding curtain shown by the phantom lines 111 of FIG. 4. Since the concave portions are formed on the same surface of the pressure adhesive sheet 12A, change of relative positions of any pair of the connecting positions causes uneven outer surface of the sunshielding curtain and thus damages the esthetic beauty of the sunshielding curtain. Furthermore, when it is not a sunny day, it is difficult to remove the curtain from the glass window.

SUMMARY OF THE INVENTION

The main object of the present invention is to provide a sunshielding curtain which can adhere effectively on the glass window of an automobile and whose outer surface cannot become uneven when exposed to the sun for a relatively long period.

Another object of the present invention is to provide a sunshielding curtain which can be removed easily from the glass window when it is not in use.

Accordingly, the sunshielding curtain of the present invention is adapted to be adhered on a glass window of an automobile. The sunshielding curtain includes a pressure sensitive adhesive sheet unit adhered to the glass window, and a sunshielding sheet heat-sealed to the adhesive sheet unit. The sunshielding sheet is generally rectangular and has a top side, a bottom side and two vertical sides which interconnects the top and bottom sides, whereby forming four corners. The adhesive sheet unit includes a horizontal row of adhesive subunits each of which has a central portion that is heat-sealed to the shielding sheet. In this way, when the curtain is exposed to the sun for a long time, deformation of the adhesive subunits cannot cause deformation of the sunshielding sheet. Each of the adhesive subunits of the adhesive sheet unit is further heat-sealed to the sunshielding sheet along a horizontal seal line which is located at an intermediate portion of the top side of the sunshielding sheet so as to easily remove the curtain from the glass window along the seal line when the curtain is not in use. Two top corners of the sunshielding sheet are not heat-sealed to the adhesive sheet unit. Accordingly, unexpected removal of the curtain from the glass window at the top corners can be prevented.

BRIEF DESCRIPTION OF THE DRAWINGS

Other features and advantages of the present invention will become more apparent in the following detailed description of the preferred embodiments with reference to the accompanying drawings, in which:

FIG. 2 is a sectional view of the conventional sunshielding curtain of FIG. 3, in which the phantom lines show the deformation of the curtain when exposed to the scorching sun for a relatively long period;

FIG. 6 shows a sectional view of the first preferred embodiment of the present invention taken along the line VI—VI in FIG. 5;

FIG. 7 shows a sectional view of the first preferred embodiment of the present invention taken along the line VII—VII in FIG. 5;

DETAILED DESCRIPTION OF THE PREFERRED EMBODIMENTS

Figure 1:
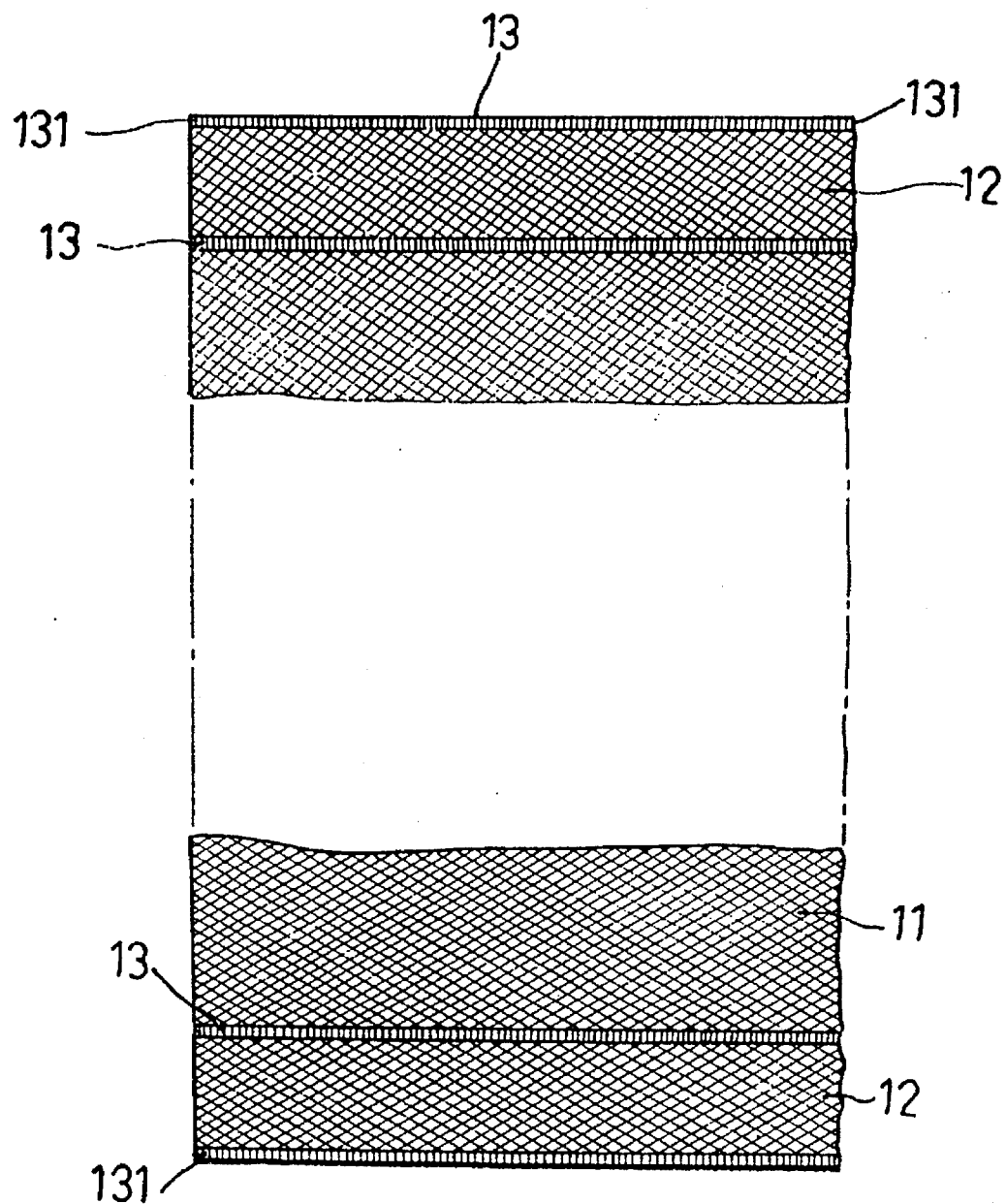
FIG. 1 is a schematic view of a conventional sunshielding curtain.
Figure 2:
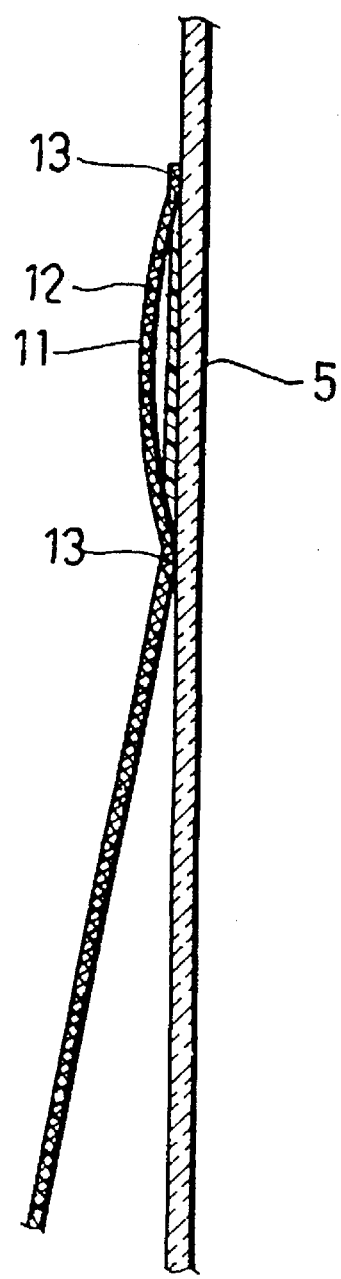
FIG. 2 illustrates how the conventional sunshielding curtain of FIG. 1 is stuck on the glass window of an automobile.
Figure 3:
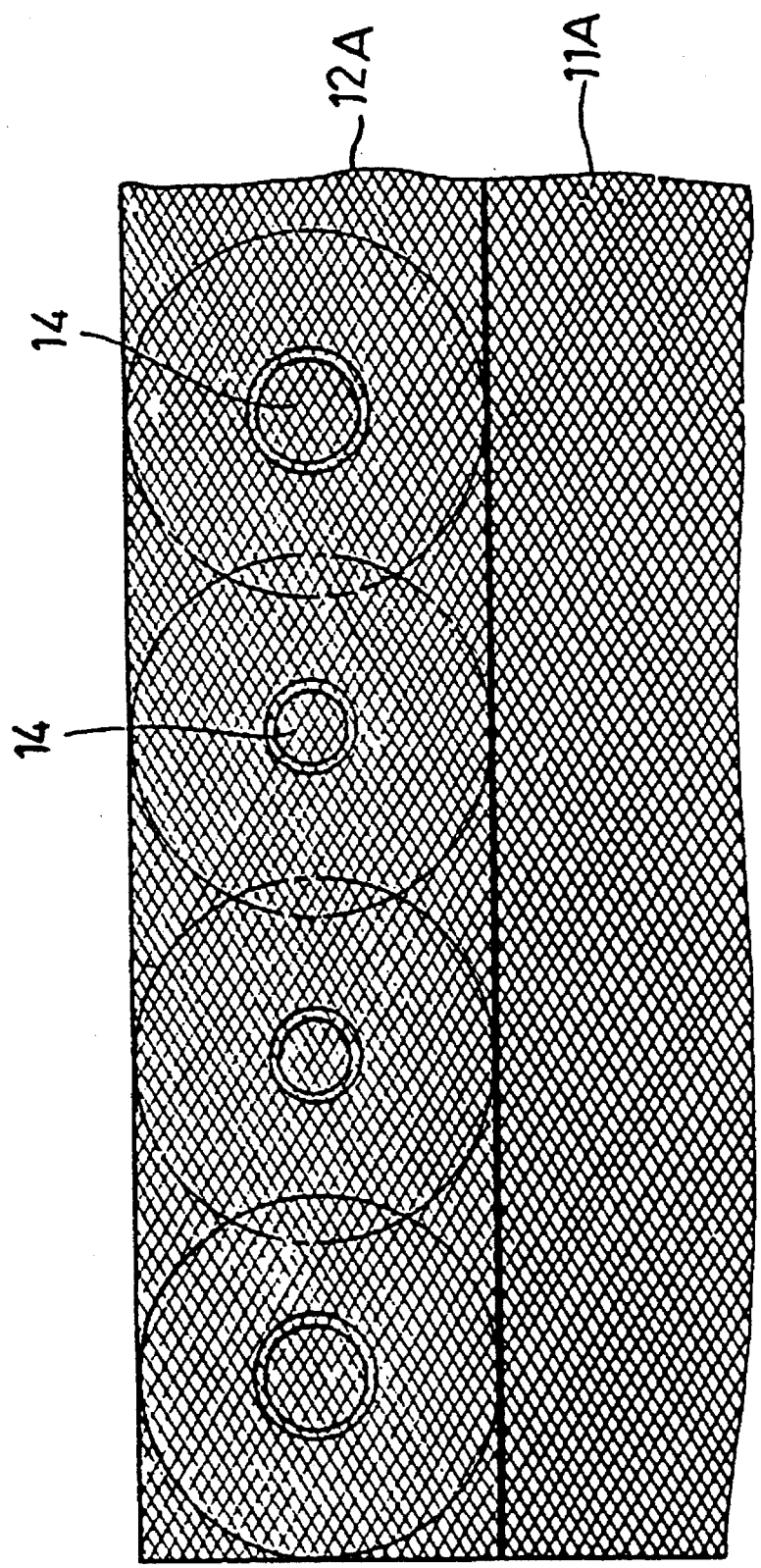
FIG. 3 is a schematic view of another conventional sunshielding curtain.
Figure 4:
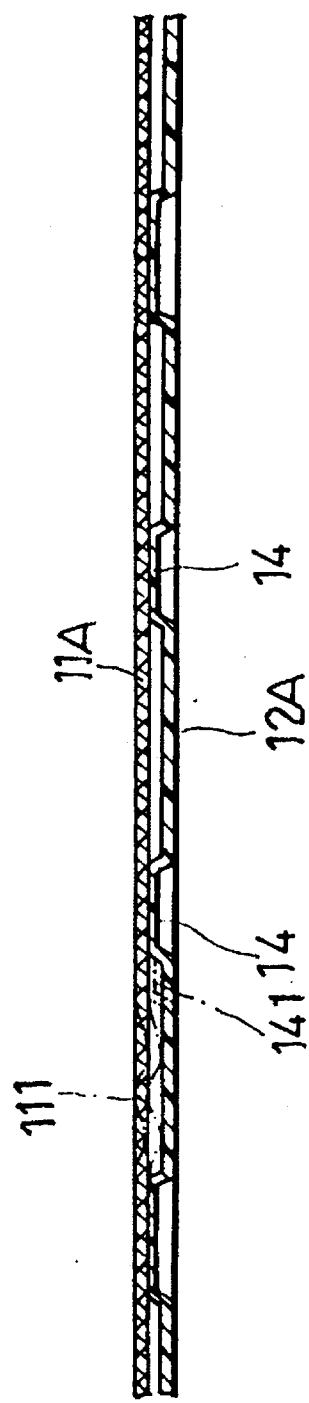
Figure 5:
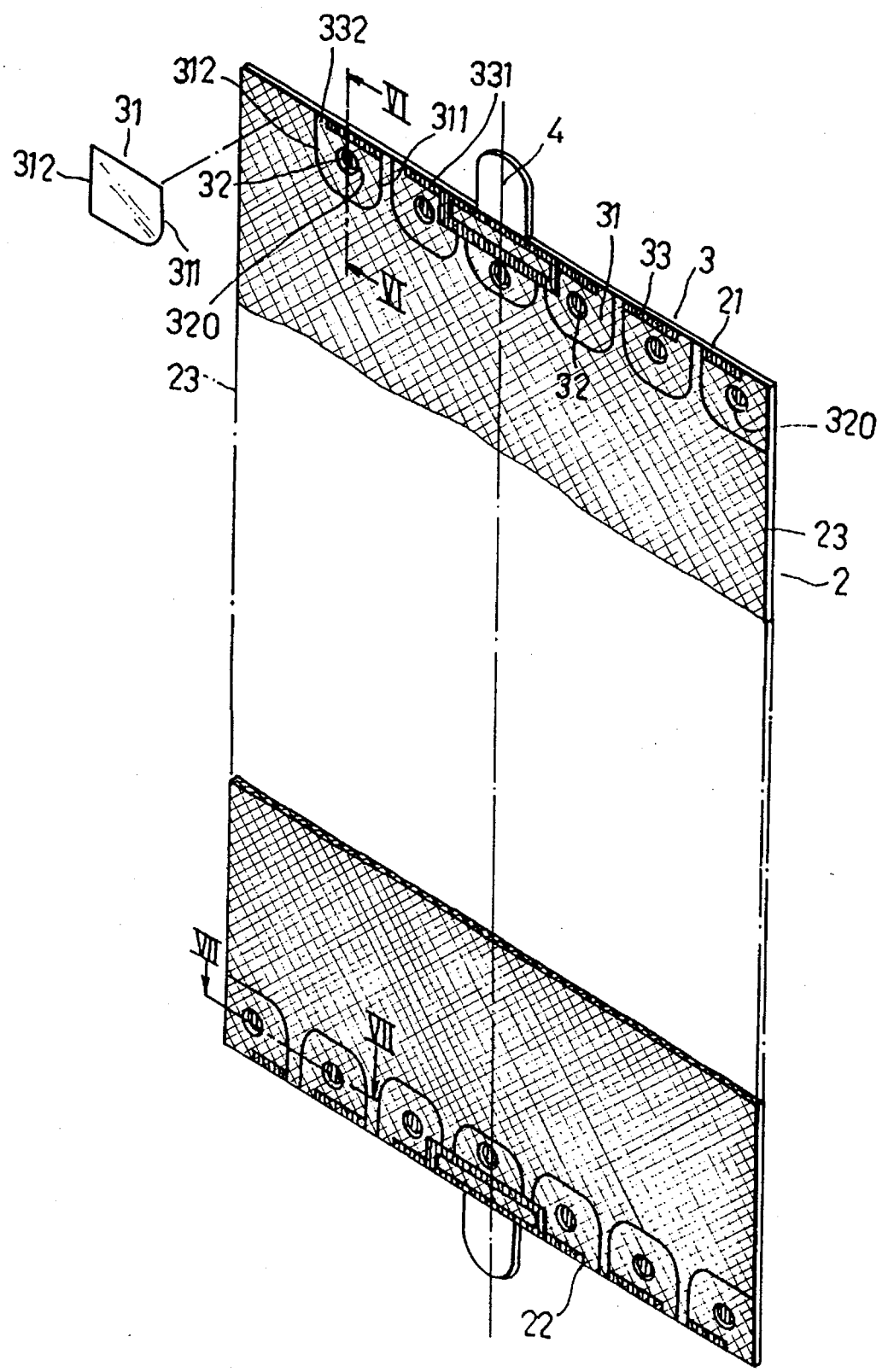
FIG. 5 shows a first preferred embodiment of a sunshielding certain of the present invention.

Referring to FIG. 5, a preferred embodiment of a sunshielding curtain according to the present invention is shown to include a pressure sensitive adhesive sheet unit 3 and a sunshielding sheet 2.

The sunshielding sheet 2 is a net member which is made of a plurality of interwoven polyester or nylon threads. The sunshielding sheet 2 has a front face which is to be exposed to the sunlight and which is coated with a layer of light-reflecting paint after undergoing a known electrostatic treatment. The sunshielding sheet 2 is generally rectangular and has a top side 21, a bottom side 22 and two vertical sides 23 which interconnects the top and bottom sides 21, 22, thereby defining four corners thereof. The adhesive sheet unit 3 is made of a plastic clinging material with sensitive adhesive characteristics, such as transparent vinyl plastic, so that it can be adhered on a glass window of an automobile.

In the first preferred embodiment, the adhesive sheet unit 3 includes two horizontal rows of adhesive subunits 31 respectively mounted at the top and bottom sides 21, 22 of the sunshielding sheet 2. To facilitate understanding, only one horizontal row of the adhesive subunits 31 is used in the explanation. Each of the adhesive subunits 31 has a central portion 32 heat-sealed to the sunshielding sheet 2, and a concave portion 320 formed around the central portion 32. The central portions 32 of the adhesive subunits 31 are spaced apart from each other. In the first preferred embodiment, each of the adhesive subunits 31 of the adhesive sheet unit 3 has two vertical sides 311, 312 and a top side which interconnects the upper ends of the vertical sides 311, 312. Each of the adhesive subunits 31 is further heat-sealed to the sunshielding sheet 2 along a horizontal seal line 331 which is located at an intermediate portion of the top side of the adhesive subunit 31 in such a manner that four adhesive subunits 31 disposed at the four corners of the curtain are not heat-sealed to the top and bottom sides 21, 22 of the sunshielding sheet 2 at four corners of the sunshielding sheet 2. Each of the seal lines 331 of the adhesive subunits 31 but the middle one extends from an intermediate portion of the subunit 31 to one of the vertical sides 311, 312 of the corresponding one of the adhesive subunits 31 along the horizontal path 33 of the top side of the corresponding one of the adhesive subunits 31 in such a manner that each of the adhesive subunits 31 except the middle one has a non-heat-sealed section 332 which is located between the seal line 331 and the other one of the vertical sides 311, 312 of the adhesive subunit 31.

FIGS. 6 and 7 are sectional views of the first preferred embodiment. In use the pressure adhesive sheet unit 3 is pressed against the glass window 5 in the direction shown by the arrow in FIG. 6. The concave portions 320 around the central portions 32 of the adhesive subunits 31 function as suction cups and create vacuum spaces between the glass window 5 and the pressure adhesive sheet unit 3, thereby securing effectively the pressure adhesive sheet unit 3 on the glass window 5. All of the non-heat-sealed portions of the adhesive subunits 31 can adhere effectively on the glass window 5 due to the electrostatic properties. Thus, separation of the curtain and the glass window 5 beginning from the corners of the curtain and unexpected removal of the sunshielding sheet 2 from the glass window 5 at the non-heat-sealed sections 332 (see FIG. 5) can be prevented.

To facilitate removal of the curtain from the glass window 5, two T-shaped pull sheets 4 are provided. The upper sheet 4 has a horizontal portion placed between the adhesive sheet unit 3 and a middle portion of the top side of the sunshielding sheet 2 and heat-sealed to the latter two along the periphery of the horizontal portion, and a vertical portion that extends upward from the horizontal portion. The vertical portion of the pull sheet 4 can be pulled to remove the curtain from the glass window 5.

Figure 8:
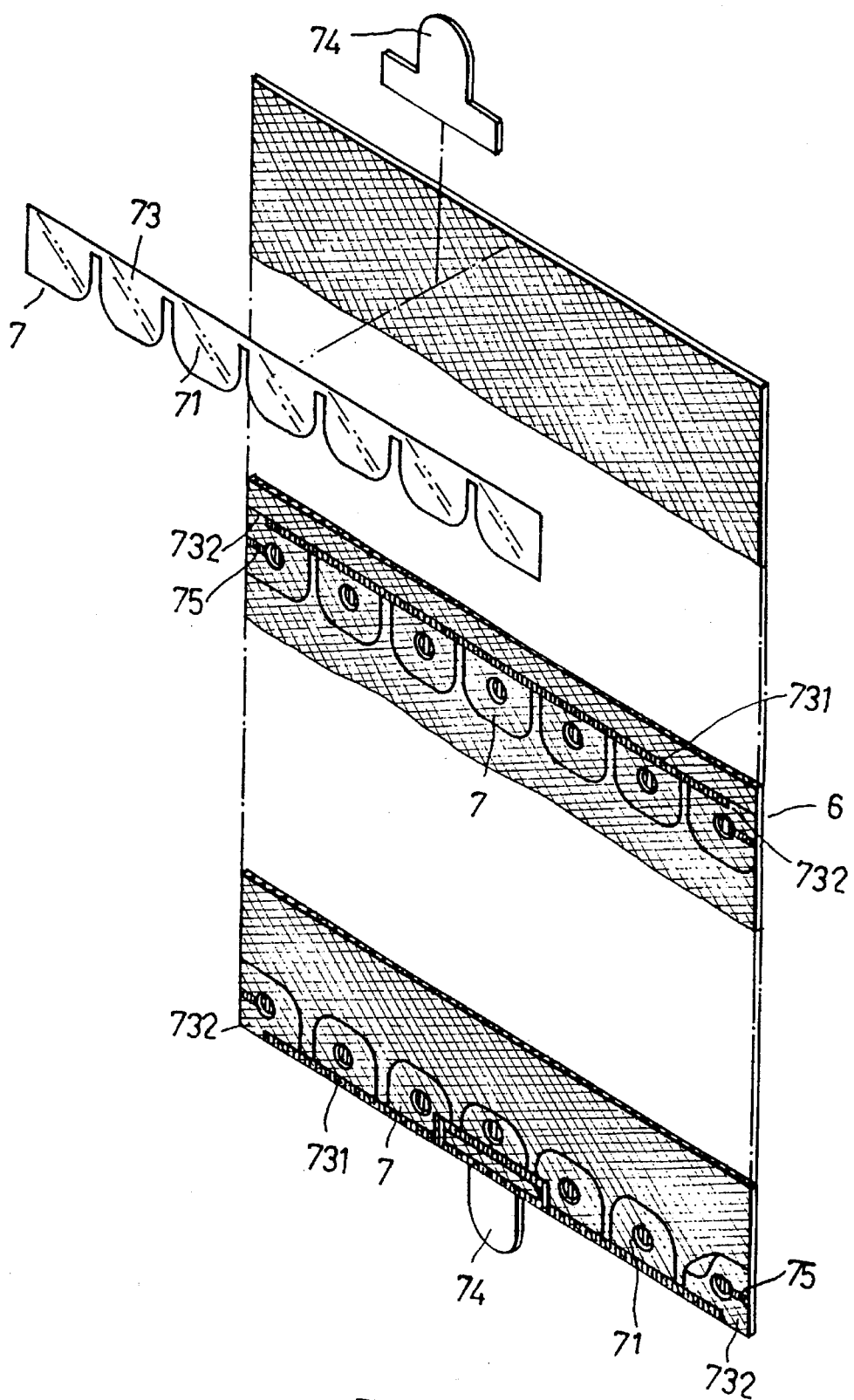
FIG. 8 shows a second preferred embodiment of the present invention.

Referring to FIG. 8, in a second preferred embodiment, the adhesive sheet unit 7 includes an upper, intermediate and lower horizontal rows 73 of adhesive subunits 71 each row of which are integrally formed at the upper portion thereof and which are spaced apart from each other at the lower portions thereof. The upper horizontal row 73 is heat-sealed on the sunshielding sheet 6 along the periphery of the top side of the sunshielding sheet 6. The intermediate horizontal row 73 is heat-sealed to the intermediate portion of the sunshielding sheet 6 while the lower horizontal row 73 to the periphery of the bottom side of the sunshielding sheet 6 in such a manner that the second preferred embodiment has three parallel non-interrupted seal lines 731 which respectively terminate at positions spaced from the vertical sides of the sunshielding sheet 6. Therefore, each of the adhesive subunits 71 which are located alongside of the vertical sides of the sunshielding sheet 6 has a non-heat-sealed section 732 which is capable of adhering on the glass window by electrostatic means upon application of the second preferred embodiment on the glass window of the automobile. The second preferred embodiment further has two T-shaped pull sheets 74, which are respectively provided at the top and bottom sides of the curtain in the same manner as the first preferred embodiment. Furthermore, each row of the adhesive subunits 71 further has two short seal lines 75 which are formed on two end subunits 71 and each of which extends horizontally from the heat-seal central portion of the corresponding subunit 71 to the corresponding vertical side of the sunshielding sheet 6. Accordingly, the curtain can be easily removed from the glass window along the short seal lines 75.

Figure 9:
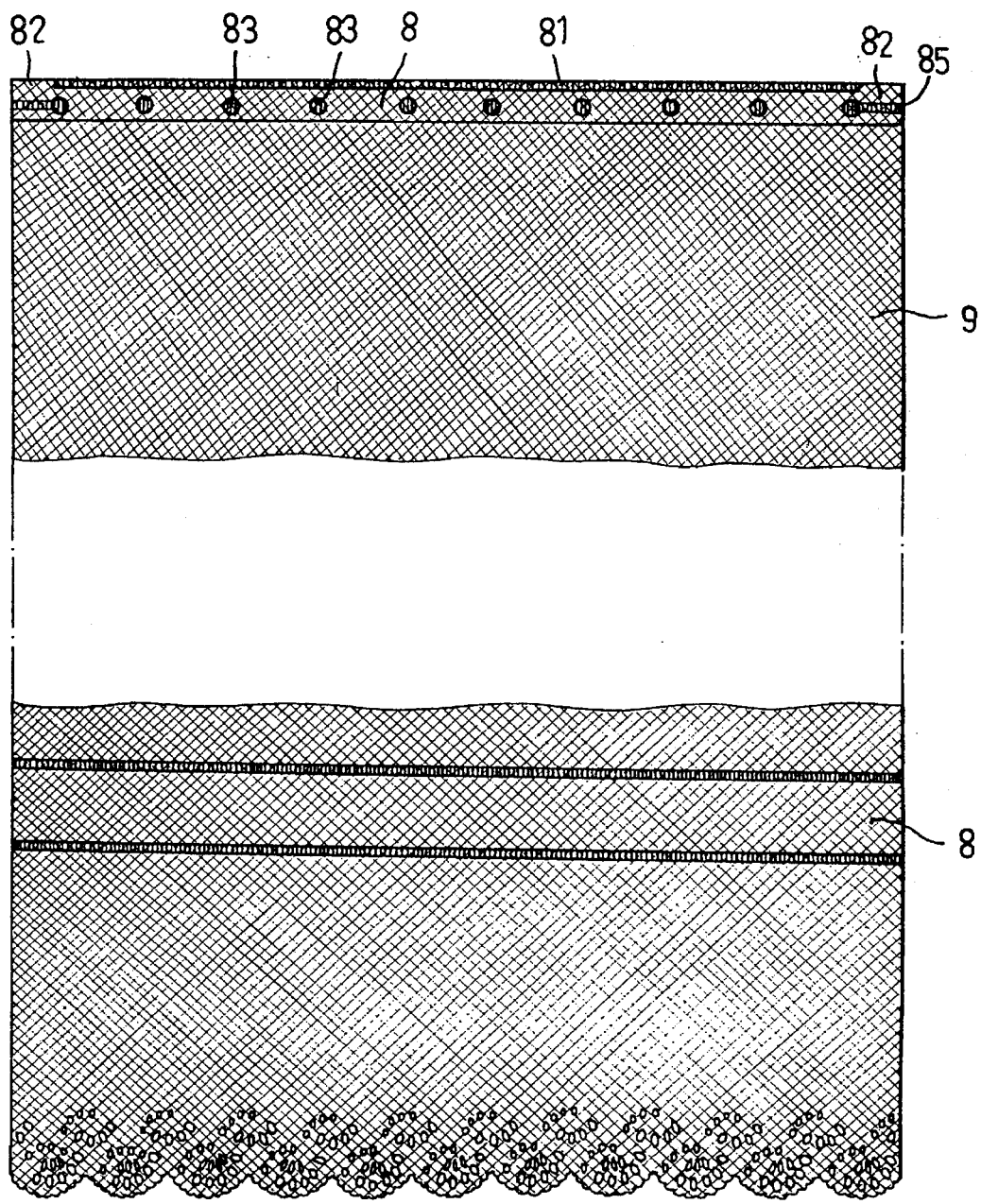
FIG. 9 shows a third preferred embodiment of the present invention.

FIG. 9 shows a third preferred embodiment of the sunshielding curtain of the present invention which includes an elongated pressure adhesive sheet unit 8 heat-sealed to the sunshielding sheet 9 in such a manner that a non-interrupted seal line 81 is formed along the periphery of the top side of the sunshielding sheet 9 and terminates at positions spaced from the vertical sides of the sheet 9, thereby forming two non-heat-sealed sections 82. A horizontal row of spaced-apart heat-sealed circular portions 83 are formed on the adhesive sheet unit 8. Note that in this preferred embodiment, two opposed end portions of the elongated adhesive sheet 8 under the non-seal sections 82 are heat-sealed to the sunshielding 9 so as to form two short seal lines 85 each of which extends horizontally and outwardly from the corresponding circular portion 83 to the corresponding vertical sides of the sunshielding sheet 9, for the same purpose as the second preferred embodiment.

In the first and second preferred embodiments, since any adjacent pair of the adhesive subunits cooperatively define an elongated space between the lower portions thereof, in case of retraction at any one of the adhesive subunits due to long-term exposure to the scorching sun, the retraction of any of the adhesive subunits cannot change relative position of any two portions of the sunshielding sheet on the glass window, thereby avoiding to cause uneven surface of the sunshielding sheet.

With the invention thus explained, it is apparent that numerous modifications and variations can be made without departing from the scope and spirit of this invention. It is therefore intended that this invention be limited only as in the appended claims.

I claim:

1. In a sunshielding curtain for an automobile, the automobile having a glass window, said curtain including a pressure sensitive adhesive sheet unit adapted to be adhered to the glass window and a sunshielding sheet which is heat-sealed to said adhesive sheet unit, said sunshielding sheet being generally rectangular and having a top side, a bottom side and two vertical sides interconnecting said top and bottom sides, wherein the improvement comprises:

said adhesive sheet unit including a horizontal row of adhesive subunits each of which has a central portion that is heat-sealed to said shielding sheet, said central portions being spaced apart from each other, each of said adhesive subunits of said adhesive sheet unit being further heat-sealed to said sunshielding sheet along a horizontal seal line which is located at an intermediate portion of said top side of said sunshielding sheet in such a manner that two corners of said top side of said sunshielding sheet are not heat-sealed to said adhesive sheet unit, each of said adhesive subunits of said adhesive sheet unit also having two vertical sides and a top side interconnecting upper ends of said vertical sides, each of said seal lines being located at an upper end portion of said sunshielding sheet and extending inwardly from an intermediate portion of said top side of a corresponding one of said adhesive subunits to one of said vertical sides of the corresponding one of said adhesive subunits, in such a manner that each of said adhesive subunits of said adhesive sheet unit further has a non-heat-sealed section which is located between said seal line and the other one of said vertical sides, whereby, unexpected removal of said sunshielding sheet from the glass window at the non-heat-sealed sections can be prevented.

2. A sunshielding curtain as claimed in claim 1, wherein said curtain further includes an inverted T-shaped pull sheet having a horizontal portion disposed between and heat-sealed to said adhesive sheet unit and said sunshielding sheet along a periphery of the horizontal portion of said pull sheet, and a vertical portion extending upward from said horizontal portion, said horizontal portion being located on a middle portion of said top side of said sunshielding sheet, whereby, said vertical portion of said pull sheet can be pulled to remove said sunshielding sheet from the glass window.

3. In a sunshielding curtain for an automobile, the automobile having a glass window, said curtain including a pressure sensitive adhesive sheet unit adapted to be adhered to the glass window and a sunshielding sheet which is heat-sealed to said adhesive sheet unit, said sunshielding sheet being generally rectangular and having a top side, a bottom side and two vertical sides interconnecting said top and bottom sides, wherein the improvement comprises:

said adhesive sheet unit including a horizontal row of adhesive subunits each of which has a central portion that is heat-sealed to said shielding sheet, said central portions being spaced apart from each other, each of said adhesive subunits of said adhesive sheet unit being further heat-sealed to said sunshielding sheet along a horizontal seal line which is located at an intermediate portion of said top side of said sunshielding sheet in such a manner that two corners of said top side of said sunshielding sheet are not heat-sealed to said adhesive sheet unit, each of said adhesive subunits of said adhesive sheet unit also having two vertical sides and a top side interconnecting upper ends of said vertical sides, said adhesive sheet unit including an upper horizontal row of said adhesive subunits extending along the top side of said sunshielding sheet, a lower horizontal row of said adhesive subunits extending along the bottom side of said sunshielding sheet, and an intermediate horizontal row of said adhesive subunits extending along an intermediate portion of said sunshielding sheet and located between said upper and lower horizontal rows of said adhesive subunits.

\* \* \* \* \*

UNITED STATES PATENT AND TRADEMARK OFFICE
CERTIFICATE OF CORRECTION

PATENT NO. : 5,570,734
DATED : November 5, 1996
INVENTOR(S) : Hans Wu

It is certified that error appears in the above-indentified patent and that said Letters Patent is hereby corrected as shown below:

Column 2, line 13, "whereby" should be --thereby--.

Column 2, line 44, "2" should be --4--.

Column 2, line 49, "certain" should be --curtain--.

Column 2, line 57, begin new paragraph with "FIG. 9".

Column 4, line 13, "a longside" should be --alongside--.

Signed and Sealed this

Eleventh Day of March, 1997

*Attest:*

BRUCE LEHMAN

*Attesting Officer*    Commissioner of Patents and Trademarks